Sept. 30, 1958 R. E. BAKER 2,854,058
TUBE EXPANDER WITH SLIP CLUTCH CONTROLLED MANDREL
Filed July 11, 1956 3 Sheets-Sheet 2
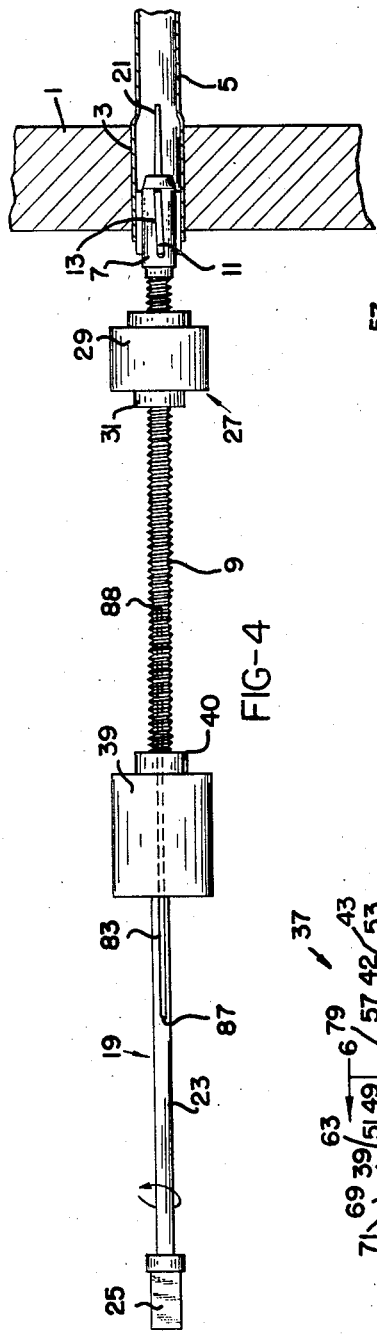
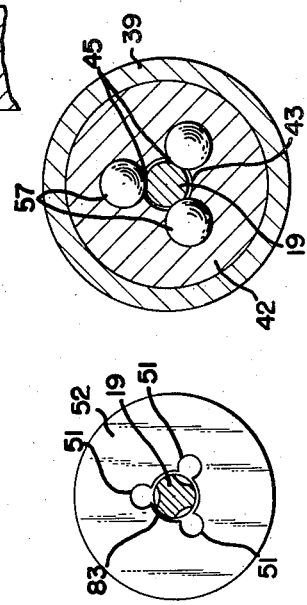
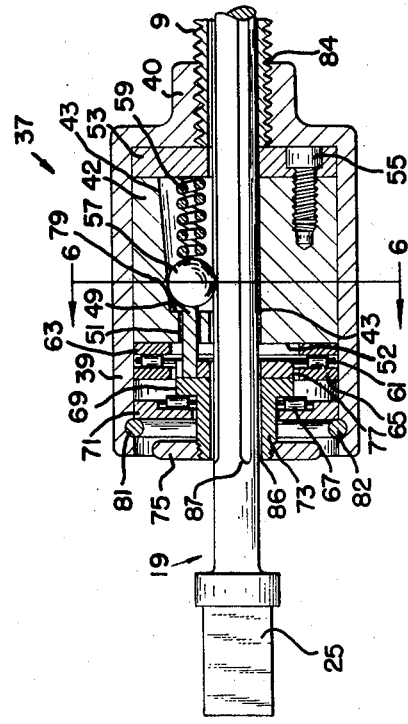
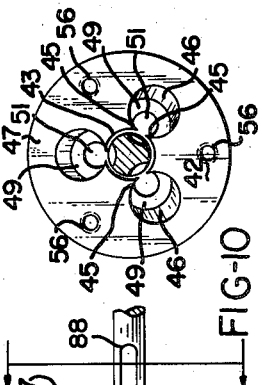
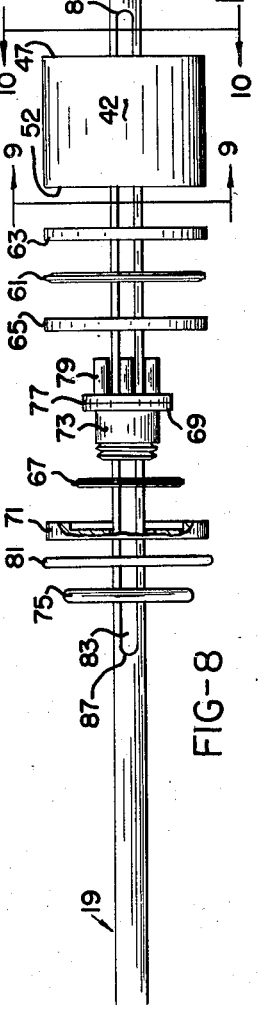
INVENTOR
ROBERT E. BAKER
BY *Toulmin & Toulmin*
ATTORNEYS Sept. 30, 1958 R. E. BAKER 2,854,058
TUBE EXPANDER WITH SLIP CLUTCH CONTROLLED MANDREL
Filed July 11, 1956 3 Sheets-Sheet 3

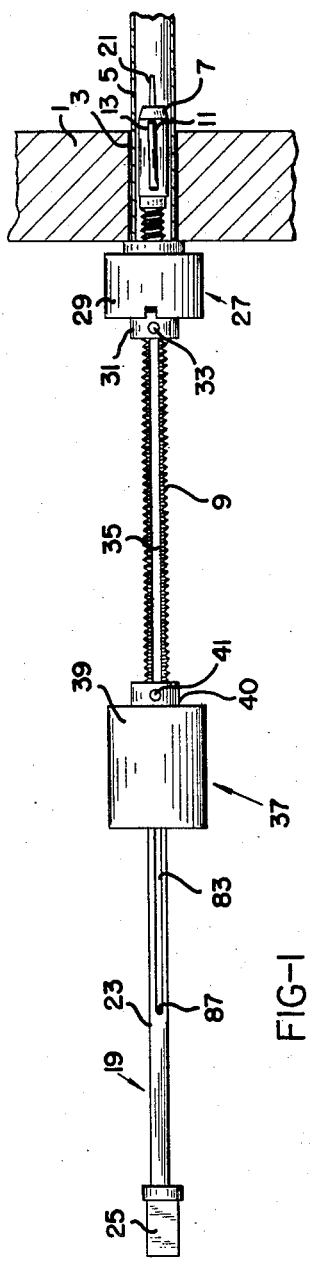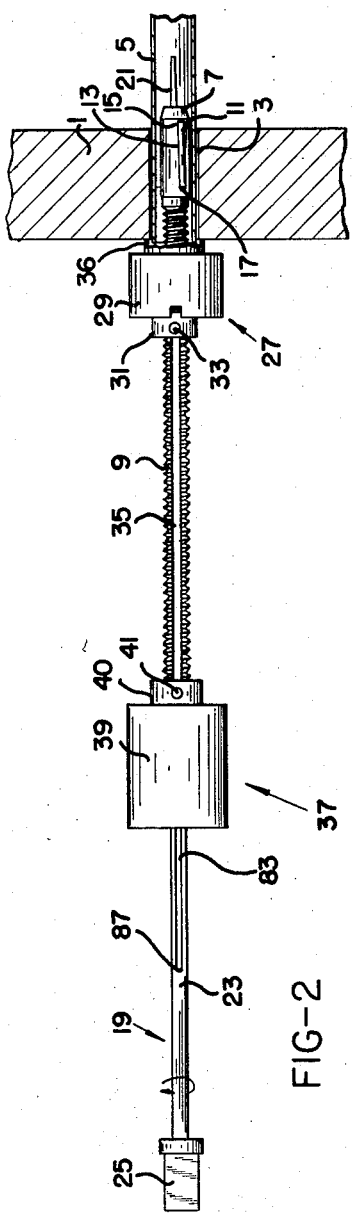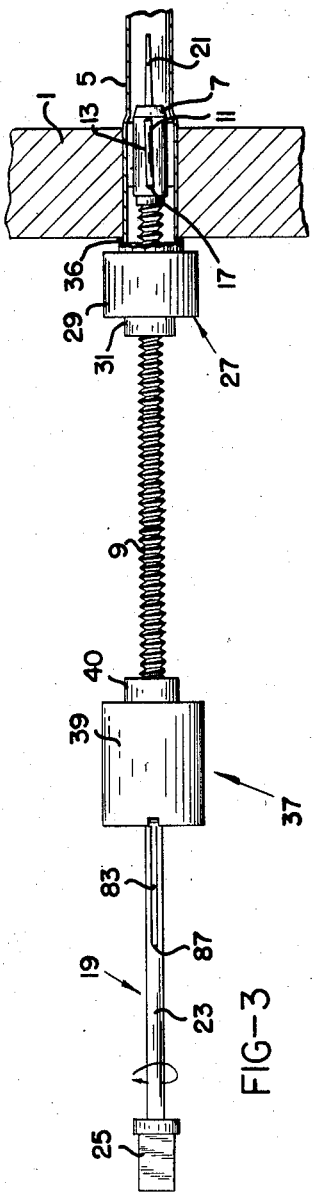

INVENTOR
ROBERT E. BAKER
BY Toulmin & Toulmin
ATTORNEYS ated Sept. 30, 1958

2,854,058

TUBE EXPANDER WITH SLIP CLUTCH CONTROLLED MANDREL

Robert E. Baker, Springfield, Ohio, assignor to The Airetool Manufacturing Co., Springfield, Ohio, a corporation of Ohio Application July 11, 1956, Serial No. 597,139

4 Claims. (Cl. 153—82)

This invention relates to tube expanders for expanding tubes into the seats of tube sheets of condensers, heat exchangers, and the like; and is particularly directed to expanders for effecting retractive expansion of tubes.

Tube expanders for effecting the retractive expansion of tubes are described in Patent No. 2,736,950 of H. C. Mathews, assigned to the same assignee as the present invention.

In the structures of that patent a cage having a plurality of radially movable rolls therein is provided with an axially movable tapered mandrel which is adapted to contact the rolls to expand the rolls radially from the cage. The mandrel contacts the rolls at an angle so that in the operation of the device the mandrel when powered, as by an electric motor, will be self-fed through the rolls to effect the expansion thereof.

For effecting the retractive expansion of the tube expanders from the interior of the seat outwardly as described in the patent the mandrel and cage are latched together against relative axial movement. It is a primary object of this invention to provide a tube expander structure in which the latching of the cage and mandrel together for effecting the retractive expansion is mechanical and self-actuating.

Further, normally in tube expander apparatus the mandrel of the expander carries on the extremity thereof which enters the tube a nut which is of sufficient size to prevent the mandrel from being withdrawn through the cage which surrounds the mandrel. Such nut is a source of difficulty as it tends to scratch and mar the interior of the tube of the heat exchanger or other device, providing a defect from which corrosion, for example, may stem.

It is an important object of this invention to provide a structure of a tube expander in which such nut is eliminated while the mandrel is yet retained within the cage.

It is a further object of this invention to provide a novel structure of a tube expander which permits the facile removal of the mandrel from the cage for inspection of the mandrel when such is desired.

These and other allied objects of this invention will become apparent from the following description and accompanying drawings wherein:

Figure 1 is a longitudinal elevational view on a slightly reduced scale of a tube expander structure of invention inserted within a seat of a tube sheet and adapted for the initiation of the tube expanding operation;

Figure 2 is a view similar to that of Figure 1 but with the mandrel of the tube expander having been advanced rightwardly sufficiently to expand the rolls against the tube to tension the tube but with the tube itself as yet unexpanded;

Figure 3 is a view similar to that shown in Figure 2 but with the tube expanded against the interior of the tube seat, the mandrel having been advanced further rightwardly;

Figure 4 is a view similar to that of Figure 2 but illustrating the apparatus being withdrawn from the tube seat as a unit and with the tube expanded against the seat;

Figure 5 is an enlarged view partially in section illustrating the self-actuating latching mechanism in cooperative relation with the tube expander mandrel;

Figure 6 is a sectional view taken on line 6—6 of Figure 5;

Figure 8 is an exploded view partially in section illustrating in full scale the components of the self-actuating latching mechanism and their relationship;

Figure 9 is an end view of one of the components of the latching mechanism taken as on line 9—9 of Figure 8 and somewhat enlarged;

Figure 10 is a view like that of Figure 9 but taken on line 10—10 of Figure 8 and somewhat enlarged;

Figure 7:
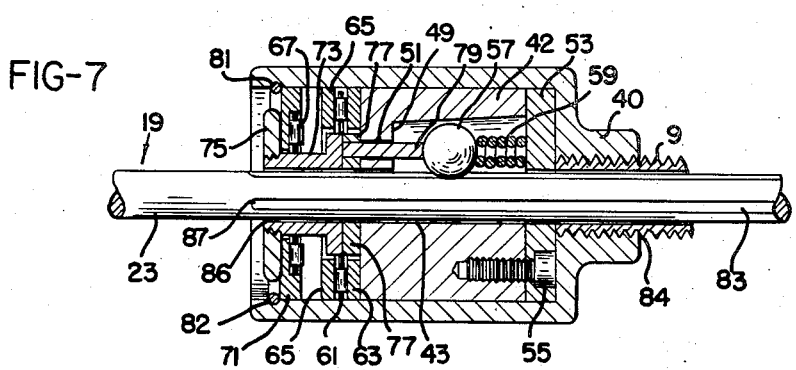
Figure 7 is a view illustrating the mechanism of Figure 5 in an actuated position.

Referring to the drawings, and particularly first to Figure 1, there is indicated at 1 a wall of a tube sheet having a seat 3 in which a tube 5 is positioned.

For convenience it is assumed that the remote end (not shown) of the tube 5 has already been secured in an opposed sheet and that the action of securing the end shown is about to be initiated.

Shown within the tube 5 adjacent the inner side of wall 1 is a head portion 7 of a cage 9, the rearward end of which has the form of a threaded sleeve; head portion 7 houses three radially movable rolls 11. The rolls 11 extend at an angle with the axis of the cage 9 and seat within slots 13, which are somewhat narrower at their outer ends than the rolls; thus the rolls are prevented from leaving the slots while there is yet provision for considerable radial movement of the rolls from the cage.

Most suitably the rolls are beveled on their ends 15, 17 to avoid the formation of spiral ridges on the tube 5 when the rolls are pressured against the tube. Most suitably also, the rolls are slightly tapered between their beveled ends to match the taper of a mandrel 19 which extends completely and axially through the cage 9.

At the right hand end, as shown in Figure 1, the mandrel 19 is tapered to a narrowed end 21. This tapered portion suitably extends as far leftwardly on the mandrel as the left hand end of the tube sheet 1 and is of sufficient length and taper to permit of complete expansion of the rolls by the tapered portion. The major portion of the length of the mandrel is cylindrical, the cylindrical portion being designated by the numeral 23.

The mandrel 19 is adapted to be driven from any suitable source, such as an electric motor (not shown) and for this purpose the mandrel is provided with a head 25 which adapts the mandrel for connection to the source of power.

The numeral 27 generally designates a stop member having a rotatable part 29 and a stationary element 31; element 31 is threaded onto the cage and retained by set screw 33 in a longitudinally extending slot 35 of the cage. This stop member 27 abuts the tube sheet 1 and is arranged to limit the depth of entry of the head portion 7 into the tube 5. The stop member also permits the cage 9 to rotate while the stop member is in abutment with the tube sheet 1. The stop member 27 is provided with a recess 36 into which metal of the tube may pass as shown in Figures 2 and 3.

The numeral 37 designates a clutch mechanism which is shown in enlarged view in Figure 5. Referring now particularly to Figure 5 a housing 39 is threaded onto the cage and is secured to the cage 9 at a throat portion 40 of the housing by a set screw 41 (Figures 1 and 2). Within the housing 39 there is retained latching mechanism comprising a member 42 in the form of a spool which is rotatably mounted within the housing. The housing 39 provides a fixed overall length for the latching mechanism.

The spool 42 is provided with a main axial bore 43 extending therethrough; the spool is also bored longitudinally over a portion of the spool length to provide a trio of raceways as at 45. The bores 46 providing raceways 45 are substantially conical and of greater diameter at the spool end 47 and taper downwardly in diameter to internal shoulders 49.

The bores 46 are angularly related to the main axial bore 43 and in communication therewith internally of the spool. The bores 46 are also each communicable with the exterior of the spool through apertures as at 51 in spool end 52, three such apertures 51 being provided by boring through the end 52 into the bores 46. The apertures 51 are of lesser diameter than the bores 46 and thus provide for the formation of the shoulders 49 around each aperture. The spool 42 is closed at one end by a circular plate 53, which is suitably secured to the spool by a plurality of headed screws, one of which is shown at 55 in Figure 5 and which screw passes into a threaded opening 56 of the spool (Figure 10).

Within each raceway 45 there is mounted a shiftable ball bearing 57 and associated with each ball bearing is a coil spring 59. The ball bearings and springs are positioned through the larger ends of bores 46 and the plate 53 biases the springs into contact with the ball bearings and normally forces the balls towards the narrow end of bores 46. The springs 59 are loosely mounted in the bores merely abutting the plate 53 and the ball bearings and the springs suitably exert sufficient pressure to bias the balls into engagement with the mandrel against the force of gravity.

A thrust bearing indicated at 61 is supported between races 63, 65 in the form of rings rotatably mounted within the housing 39; race 63 abuts spool 42. A second thrust bearing 67 is supported between circular disc 69 and a larger diameter race 71 which latter is in rotatable engagement with the housing 39. The bearing 67 lies within a cavity of this larger diameter race 71. The relatively small diameter disc 69 is integral with a hollow stub shaft 73 which is rotatably mounted about the mandrel 19 and which is itself rotatably supported by the bearing 67 and race 71.

Threaded onto the outer end of the stub shaft 73 is a cap 75. An inner flange 77 (Figure 5) is spot welded to the disc 69 on the stub shaft 73 and has a trio of cylindrical plunger fingers 79 brazed thereto and extending inwardly therefrom through each of the apertures 51 and into contact with the ball bearings 57. The spring pressure on ball bearings 57 urges the fingers and stub shaft leftwardly in Figure 5 but disc 69 abuts the bearing 67 and restricts leftward movement of the fingers.

A circular split lock spring 81 abuts the bearing support race 71 and seats in a groove 82 of the housing 39 to retain the latching assembly together as shown in Figure 5.

Referring now particularly to Figures 5 and 10 the raceways 45 each open towards the central main bore 43 of the spool, which bore is aligned with a bore 84 of the housing 39 (which bore receives cage 9) and with a bore 86 of the stub shaft 73, as most clearly shown in Figure 5.

Referring further to Figure 9, the mandrel 19 which passes centrally through the bore of the latching assembly is provided about the periphery thereof with a trio of longitudinally extending grooves 83, and each ball 57 is positioned in a groove and adapted to roll longitudinally therein. The grooves 83 at their extremities as at 87 and 88 provide abutments for the balls 57, and the balls are thereby normally restricted from leaving the grooves lengthwise, the plunger fingers 79 being of insufficient length to move the balls far enough into the larger end of the raceways to permit the balls to clear the abutments.

Referring now to the operation of the device the stop member 27, when a tube is to be expanded, is appropriately adjusted to provide the head portion 7 and the roll 11 within the seat 3 of a tube sheet, as shown in Figure 1. In this position the rolls are contracted, the head portion is free of the tube 5, and the tube 5 is itself free of the seat. The mandrel 19 (and the motor which drives it) are moved manually rightwardly from the Figure 1 position to expand the rolls and to bring them into contact with the tube, the tube itself being (as shown in Figure 2) still free of the tube seat. Manual pressure on the mandrel is sufficient to cause the balls 57 to move slightly longitudinally from the Figure 5 position to the Figure 7 position against the action of the springs 59. Such forward movement, facilitated by rolling and sliding of the balls in the grooves 83, of the mandrel causes the expansion of the rolls by the entry of the tapered portion 21 to well within the rolls.

The mandrel 19 as indicated by the arrow of Figure 2 is thereafter driven in a clockwise direction and the self-feeding angles of the rolls 11 with respect to the mandrel causes the mandrel to be further drawn into the tube 5 and the rolls to be expanded further against the tube 5, longitudinal movement of cage 9 being restricted by stop member 27. This causes the tube 5 itself to be tensioned and a slight metal flow of tube 5 occurs into the recess 36 (Figure 2).

The mandrel is drawn through the latching mechanism in this operation, because as the mandrel self-feeds the balls 57 are urged out of latching contact with the mandrel by the mandrel itself acting against the springs through the balls. Thereafter the mandrel is further driven until the tube engages the interior of the seat securely (Figure 3).

When the interior portion of the tube has been expanded against the seat the direction of rotation of the mandrel is then reversed. The mandrel is locked to the cage against relative longitudinal movement in the reverse direction through the action of the self-actuating latching mechanism comprising the spring biased balls 57, and the latching mechanism and the tube expander, as shown in Figure 4, will self-feed outwardly of the tube seat as a unit with the rolls in expanded position.

During this self-feeding the mandrel and cage are locked against longitudinal movement but are free to rotate relative to each other as the latching mechanism is rotatable in it's housing which is secured to the cage.

This expanding operation causes some further amount of the metal of the tube to be drawn outwardly of the tube seat and the same may either be removed or peened over. During the expanding operation the springs 59 urge fingers 79 rearwardly (Figure 5).

When the tube expander has been completely withdrawn, the mandrel may be released from latching engagement with the cage through the manually operative means comprising the cap 75 and plunger fingers 79, it being merely necessary to push the cap inwardly causing the plunger fingers to displace the balls out of latching engagement towards wider portions of the raceways 45. This movement is limited by abutment of end 52 of the spool by flange 77, the race 71 being abutted by the cap 75 and being movable with the cap. The mandrel is then again ready to be set for use in the expansion of another tube.

The grooves 83 as already noted restrict mandrel movement for the balls cannot pass out of the ends of the grooves. Accordingly it is not necessary to provide a nut at the tapered ends of the mandrel to retain the mandrel within the cage 9. The balls 57 in cooperation with the slots of the mandrel effectively serve the purpose of preventing leftward movement of the mandrel while rolls 11 prohibit excessive rightward movement (Figure 1). Accordingly the mandrel cannot be accidentally slipped from the cage even in the actuated position of the plunger mechanism.

Figure 11:
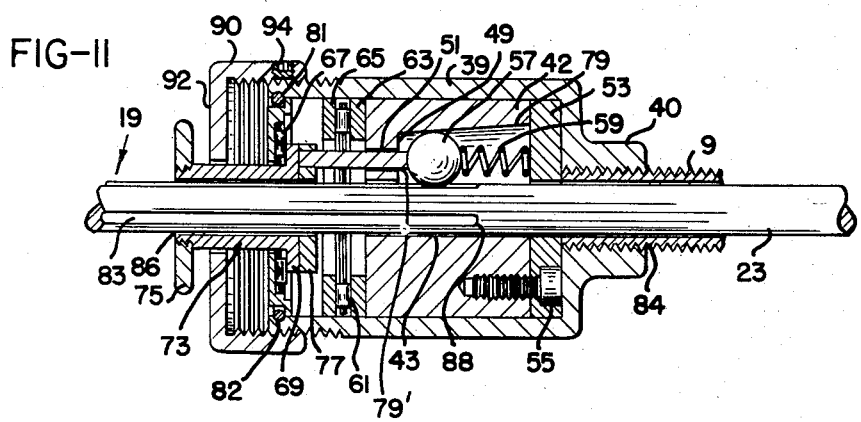
Figure 11 is a fragmentary view in section illustrating a modification of the structure of invention in a latching position.
Figure 12:
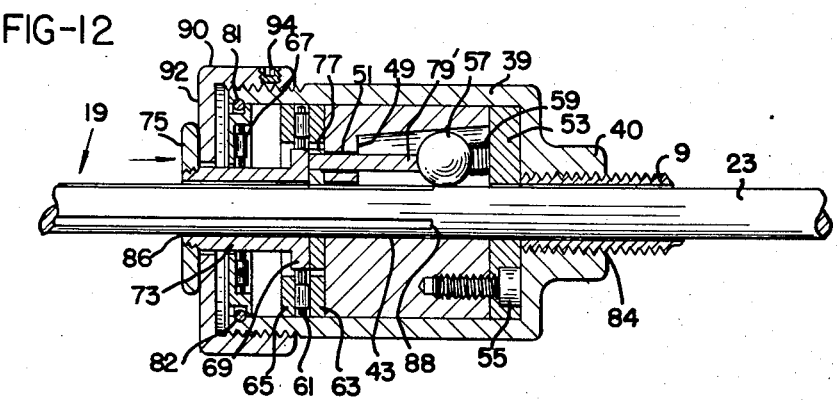
Figure 12 is a view similar to that of Figure 11 but with the mechanism in an actuated position.

A modification of the structure of invention is shown in Figures 11 and 12. It is desirable in tube expanding operations to be able to conveniently remove the mandrel from the cage for inspection of the condition of the mandrel. For this purpose, as shown in Figures 11 and 12, there is provided on housing 39 a threaded member 90 having a circular flange 92. Threaded member 90 is movable longitudinally on housing 39 and to be retained in a fixed adjusted position by set screw 94. Circular flange 92 is adapted to abut cap 75 and to restrict movement thereof into the housing 39.

Plunger fingers 79' are longer relative to the housing than plunger fingers 79. With member 90 threaded leftwardly on the housing the flange 92 limits the extent of the fingers operable to actuate the balls and the operation is as described in connection with the preceding figures.

When however it is desirable to remove the mandrel from the cage to inspect the mandrel in the course of the work, it is simply necessary to thread the member 90 rightwardly, to permit the cap 75 and fingers 79' to enter further into the housing; this permits the balls to clear the abutments of the grooves and the mandrel to be withdrawn from the cage.

While the embodiments described have included grooves in the mandrel providing a positive clutching action, it is to be understood that it is not absolutely necessary that the mandrel be grooved. The peripheral surface of the mandrel could be absolutely smooth and cylindrical and the clutch will operate as a friction clutch, for one or more of the rolls would be forced under the influence of the springs and in frictional engagement with the mandrel to provide a driving connection between the mandrel and the latching mechanism.

Also, while three balls are preferable in order to maintain completely positive engagement between the mandrel and the balls in all rotative positions and to provide for a minimum of slippage, a greater or lesser number of balls may be utilized.

The bores forming the raceways, while preferably conical, are not necessarily so, but such provides for smooth action of the balls. However, the raceways should extend at a slight angle to the main bore.

It will be understood that this invention is susceptible to modification in order to adapt it to different usages and conditions and accordingly, it is desired to comprehend such modifications within this invention as may fall within the scope of the appended claims.

I claim:

1. In a tube expander, a cage having a plurality of rolls mounted partially within angularly arranged slots for rotational and limited radial movements therein, an axially movable mandrel passing rotatably through said cage in contact with the inner sides of said rolls at a self-feeding angle therewith, the portion of said mandrel adjacent said cage being tapered for moving said rolls to expanded and contracted positions, a sleeve fixed to said cage and extending axially therefrom on the same side as the larger portion of said tapered mandrel, stop means adjustably mounted on said sleeve, said mandrel extending a substantial distance beyond said sleeve and having non-circular drive engaging means fixed on the end thereof, said mandrel being of substantially uniform diameter between said tapered portion and said drive engaging means, a clutch mounted on the free end of said sleeve and comprising means engaging a groove in said mandrel for permitting relative rotation of said mandrel and axial movement thereof within said sleeve in the direction of said cage but preventing relative axial movement in the opposite direction, and readily accessible manually operable means for releasing said clutch means.

2. A tube expander as claimed in claim 1 and in which the clutch is a ball clutch and the means engaging the groove is a ball of the clutch in a raceway of the clutch, the readily accessible manually operable means comprising a finger-carrying plunger having a finger of the plunger engageable with the ball for releasing the ball from the groove into the raceway.

3. A tube expander as claimed in claim 1 and in which the clutch is a ball clutch and the means engaging the groove is a ball of the clutch in a raceway of the clutch, the said mandrel having abutment means for the ball formed by the groove ends limiting ball movement longitudinally in the groove, and the readily accessible manually operable means comprising a finger-carrying plunger having a finger of the plunger engageable with the ball for releasing the ball from the groove and from the abutment means and into the raceway of the clutch.

4. A tube expander as claimed in claim 1 and in which the clutch is a ball clutch and the means engaging the groove is a ball of the clutch in a raceway of the clutch, the said mandrel having abutment means for the ball formed by the groove ends limiting ball movement longitudinally in the groove, and the readily accessible manually operable means comprising a finger-carrying plunger which extends axially of the mandrel and is adjustably mounted on the clutch for limited axial movement toward and away from the clutch, the plunger having a finger engageable with the ball for releasing the ball from the groove into the raceway in one adjusted position of the plunger and for releasing the ball into the raceway from the groove, and from the abutment means also, in the other limiting axial position of the plunger.

References Cited in the file of this patent

UNITED STATES PATENTS

| | | |
|---|---|---|
| 909,223 | Reynolds | Jan. 12, 1909 |
| 2,348,611 | Davidson | May 9, 1944 |
| 2,767,766 | Mathews | Oct. 23, 1956 |